Aug. 28, 1951 N. J. SMITH 2,565,890
TEMPERATURE INDICATING THERMOSTATIC SWITCH
Filed Dec. 11, 1948 2 Sheets-Sheet 1
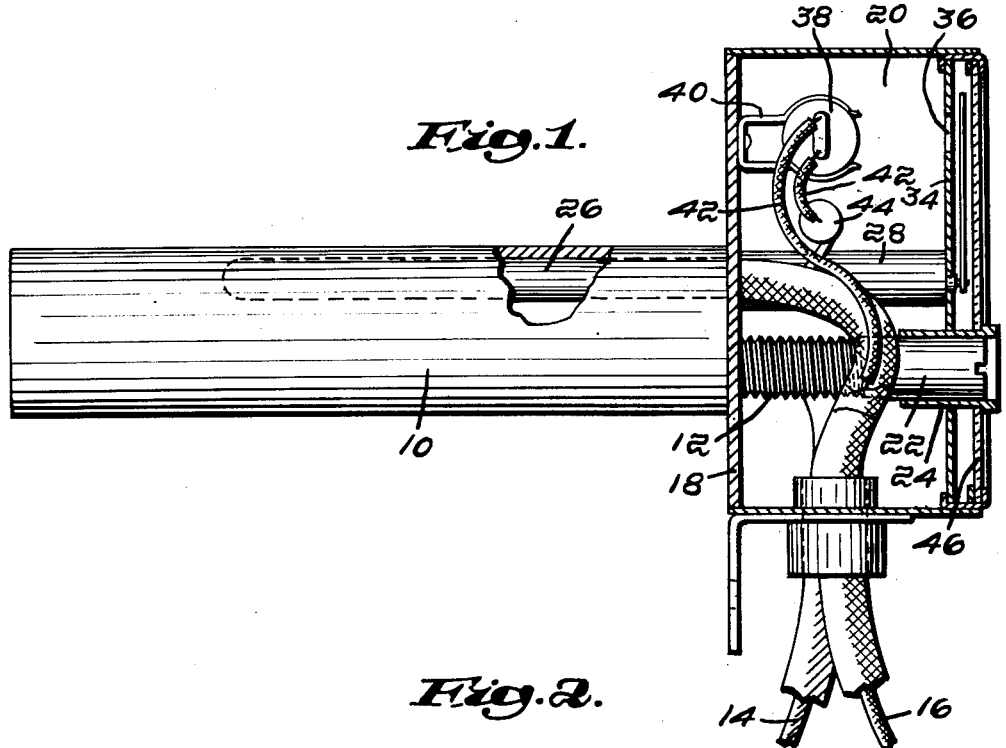
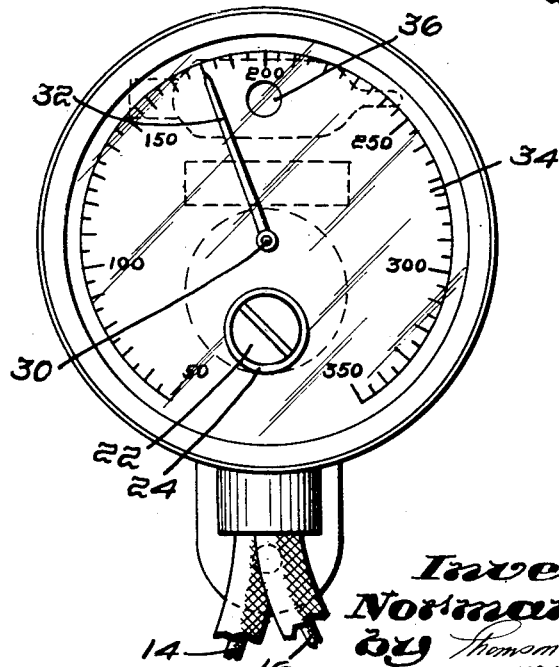
Inventor:
Norman J. Smith,
by Thomson & Thomson
Attorneys Aug. 28, 1951  N. J. SMITH  2,565,890
TEMPERATURE INDICATING THERMOSTATIC SWITCH
Filed Dec. 11, 1948  2 Sheets-Sheet 2

Inventor:
Norman J. Smith,
by Thomson & Thomson
Attorneys

Patented Aug. 28, 1951

2,565,890

UNITED STATES PATENT OFFICE 2,565,890

TEMPERATURE INDICATING THERMOSTATIC SWITCH

Norman J. Smith, Medfield, Mass., assignor to Smith Control and Instrument Corporation, Needham, Mass., a corporation of Massachusetts Application December 11, 1948, Serial No. 64,732

2 Claims. (Cl. 200—56)

This invention relates to improvements in a temperature indicating thermostatic switch consisting of the combination of a thermostatic switch of the type disclosed in my Patent No. 2,441,725 and of a bi-metal indicating thermometer of the type shown in Patent No. 1,970,219, granted August 14, 1934.

It is an object of my invention to combine a thermostatic switch with a temperature indicator whereby the switch may be readily adjusted to operate at a desired temperature since the temperature is visually indicated as the adjustment is made.

It is further an object of my invention to combine a thermostatic switch and a temperature indicator in a shell which operates the switch by expansion and contraction and in which the temperature indicator is in contact with the shell and indicates the actual temperature of the shell.

Further objects and advantages of my improvements will be more readily apparent from the following description of preferred embodiments thereof, as is illustrated in the accompanying drawings; in which, Figure 1 is a side elevation of a thermostatic switch and temperature indicator, the head casing being shown in vertical section and the shell enclosing the switch being broken away to show the temperature indicator.

Figure 2 is a front elevation of the thermostatic switch and temperature indicator shown in Figure 1;

Figure 3:
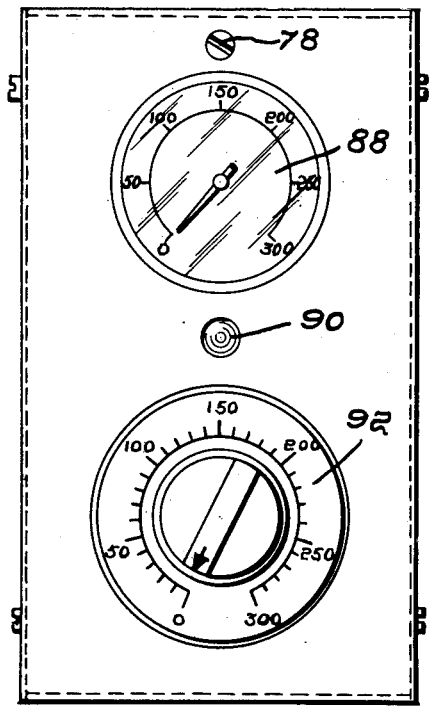
Figure 3 is a front elevation of a modified construction.

In Figs. 1 and 2, the thermostatic switch is mounted in the shell 10 and is provided with an adjusting screw 12 which may be used to set the temperature at which the switch will operate. The switch controls the current in an electrical circuit including the wires 14 and 16. The switch may be designed either to close the circuit between the wires 14 or 16 at the desired temperature or to open the circuit at that point.

The expansible shell 10 is attached to the head case 18 which is shown as circular in shape and enclosing a chamber 20. The head 22 of the adjusting screw 12 is supported by the sleeve 24. The shell 10 receives the bi-metal temperature responsive thermometer 26, and the operative parts of the thermometer 26 extend through the tube 28 within the compartment 20. The thermometer or the tube thereof is placed in contact with the expansible shell 10, whereby the indicated temperature agrees with the actual temperature of the shell 10 which operates the thermostatic switch. The pin 30 is turned by a change in temperature and moves the indicating finger 32 around the dial 34. The dial has an opening 36 through which the light from a small bulb 38 is visible. The electric light bulb 38 is mounted in a bracket 40 fastened to the case 18 and the electric wiring 42 places the light bulb in the circuit between the wires 14 and 16 and in series with the make and break of the thermostatic switch. A suitable resistor 44 may be included in the circuit, if desired. The face of the case 18 may have a glass cover 46.

It will be understood that the device shown in Figures 1 and 2 may be readily adjusted by heating the shell 10 of the thermostatic switch until the indicator 32 shows the desired temperature then the adjusting screw 12 is turned until the electrical circuit is completed, as shown by the light from the bulb 38; or if the circuit is normally closed the adjusting screw is turned until the light goes out.

Figure 4:
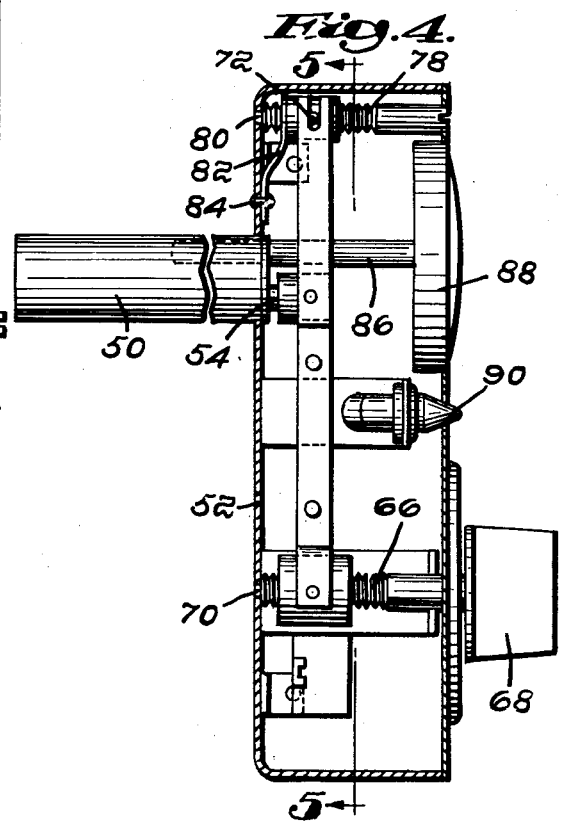
Figure 4 is a side elevation of the device shown in Figure 3, the casing being shown in vertical section.
Figure 5:
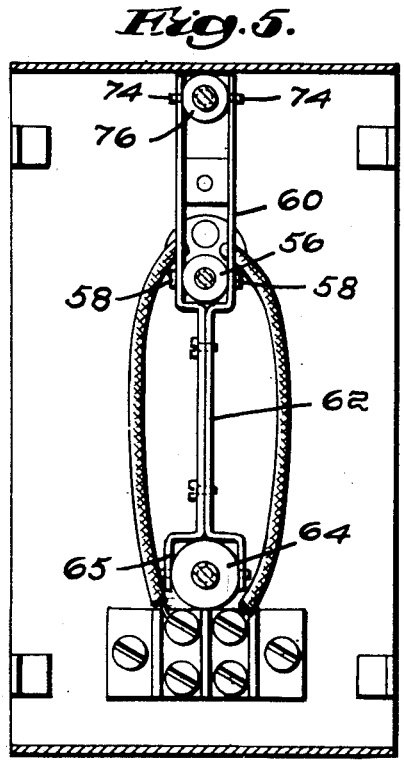
Figure 5 is a cross-section taken on the plane indicated 5—5 in Figure 4.

Figures 3, 4 and 5 show a modified construction in which 50 is the case for the thermostatic switch and 52 is the casing for the operative parts. In this arrangement, the plunger 54 constitutes the adjusting member for the thermostatic switch. The head 56 of the plunger 54 is mounted on trunnions 58 in the yoke 60 of a compound lever 62. At its lower end the lever 62 is connected to the sleeve 64 also having a trunnion bearing in the yoke 65 at the lower end of lever 62. The sleeve 64 is threaded to the adjusting screw 66 which may be turned by the knob 68. The inner end of the screw 66 has a bearing 70 in the back wall of the case 52. At its upper end, the yoke 60 of lever 62 has the slots 72 which receive the trunnion pins 74 of the nut 76 which is threaded to the second adjusting screw 78. The screw 78 has a bearing at 80 in the back wall of the casing 52. The nut 76 is held against rotation by the spring finger 82 which is fastened to the nut and to the case at 84. A tubular thermometer 86 is provided as in Figures 1 and 2 and is connected to the dial 88. A light bulb 90 is also provided in the electrical circuit. The adjusting knob 68 of the screw 66 is associated with a temperature dial 92 to indicate the temperature at which the switch is set.

In practice, the instrument would be brought up to a suitable mid-point temperature, for example 150° and the adjusting knob 68 turned to agree with this point. The calibration screw 78 can then be adjusted until the thermostatic switch operates at the desired temperature. The screw 78 serves as a calibration screw to adjust the pivot for the lever 62 whereby the setting of the knob 68 will then agree with the temperature indicator. After the calibration screw 78 has been set, the temperature range of the thermostatic switch may be adjusted by turning the knob 68 to the desired point. In this case, the lever 62 forms in effect a multiplying lever to obtain a close adjustment of the action of the thermostatic switch.

I claim:

1. In a thermostatic switch, a thermo-responsive casing enclosing the switch, a slideable adjusting member for said switch, a lever pivotally connected to said adjusting member between its ends, a calibrating screw for setting the fulcrum end of said lever and means for moving the other end of said lever to adjust the point at which the switch is set to operate.

2. In a thermostatic switch, a head casing, a thermo-responsive tubular casing extending from said head casing, said tubular casing enclosing a thermostatic switch, a slideable adjusting member for setting said thermostatic switch extending into said head casing, a lever in said head casing pivotally connected to said adjusting member intermediate the ends of said lever, a calibrating screw mounted in said head casing and movable to set the position of one end of said lever, a temperature setting screw mounted in said casing and movable to position the other end of said lever, a temperature indicating dial associated with the setting screw whereby the point at which the temperature switch is set to operate may be determined by turning the setting screw to indicate the desired temperature on the dial after the calibrating screw has been properly adjusted.

NORMAN J. SMITH.

REFERENCES CITED

The following references are of record in the file of this patent:

UNITED STATES PATENTS

| Number | Name | Date |
| --- | --- | --- |
| 1,937,458 | Armstrong | Nov. 28, 1933 |
| 1,970,219 | Bloch | Aug. 14, 1934 |
| 2,439,455 | Delancey | Apr. 13, 1948 |
| 2,441,725 | Smith | May 18, 1948 |
| 2,464,944 | Rosche | Mar. 22, 1949 |